United States Patent [19]

Pitchford et al.

[11] Patent Number: 5,756,933
[45] Date of Patent: May 26, 1998

[54] WALL MOUNTABLE UNIVERSAL BRACKET FOR USE WITH A RACEWAY SYSTEM

[75] Inventors: Eric V. Pitchford; Gerald E. Proctor. both of Pittsburgh; William Boehmer. Clairton, all of Pa.

[73] Assignee: Medaes, Inc., Norcross, Ga.

[21] Appl. No.: 318,347

[22] Filed: Oct. 5, 1994

[51] Int. Cl.$^6$ .................................................. H05K 5/00
[52] U.S. Cl. ................................................ 174/48; 52/287.1
[58] Field of Search ................................ 174/48, 49, 101, 174/68.3; 439/114; 113, 215; 52/242, 27, 28, 287.1; 312/297, 209

[56] References Cited

U.S. PATENT DOCUMENTS

| | | |
|---|---|---|
| 3,762,398 | 10/1973 | Schefke et al. |
| 4,104,710 | 8/1978 | Damico et al. |
| 4,165,852 | 8/1979 | Chervenak ............... 248/225.2 |
| 4,338,485 | 7/1982 | Fullenkamp et al. |
| 4,534,147 | 8/1985 | Cristell. |
| 4,821,470 | 4/1989 | Kappers et al. |
| 4,882,453 | 11/1989 | Chelsea. |
| 4,905,433 | 3/1990 | Miller. |
| 4,952,163 | 8/1990 | Dola et al. ............... 439/211 |
| 5,024,614 | 6/1991 | Dola et al. |
| 5,301,917 | 4/1994 | Dyer ......................... 248/74.2 |
| 5,383,318 | 1/1995 | Kelly et al. ............... 52/287.1 |
| 5,511,349 | 4/1996 | Kelly et al. ............... 52/287.2 |

Primary Examiner—Kristine L. Kincaid
Assistant Examiner—Joseph Waks
Attorney, Agent, or Firm—Albert S. Anderson

[57] ABSTRACT

A universal bracket has affixed to it a raceway system, a three conduit gas rail sub-assembly, and high and low voltage electrical conductors. The raceway system includes various "knock outs" which permit access to the internal passageways of the system to facilitate installation of wiring and flow passageways. The gas rail sub-assembly may be mounted on the universal bracket in any one of two diverse orientations. In the preferred embodiment, the universal bracket is mounted on a vertical surface of a hospital room.

14 Claims, 8 Drawing Sheets

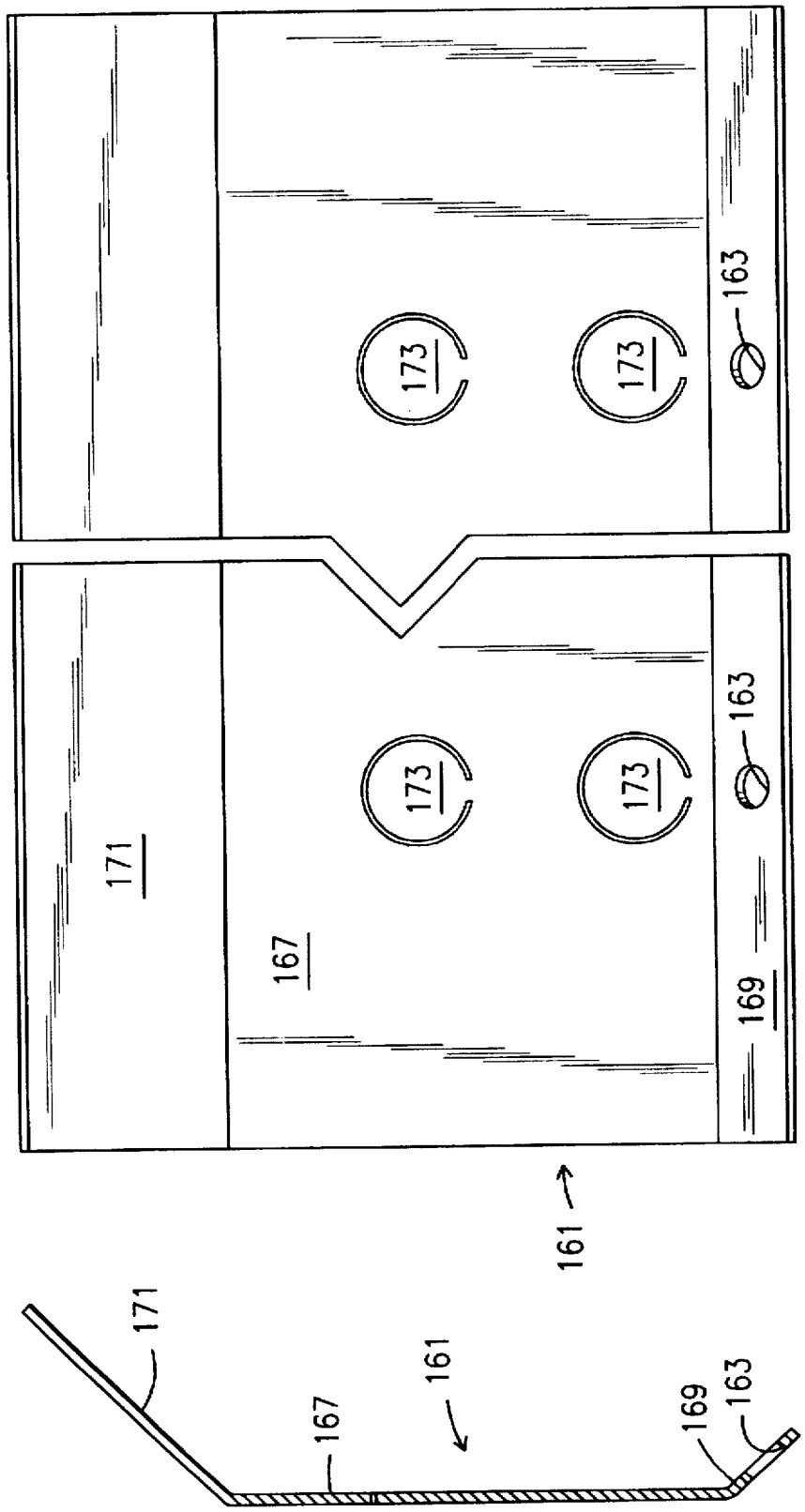

WALL MOUNTABLE UNIVERSAL BRACKET FOR USE WITH A RACEWAY SYSTEM

BACKGROUND OF THE INVENTION

The present invention relates to a wall mountable raceway system for a hospital room. In the prior art, such devices are generally known. However, Applicants are unaware of any such device employing a universal bracket and including all of the features and aspects of the present invention.

The following prior art is known to Applicant:

U.S. Pat. No. 3,762,398 to Schefke et al. discloses a mobile and flexible intensive care unit which contains monitoring devices and ancillary services designed to support the life of a patient undergoing intensive care. Various electrical and gas connections are provided. The present invention differs from the teachings of Schefke et al. as contemplating a wall mountable supply rail system designed to supply all electrical and gas services to and from a hospital room with unique features nowhere taught or suggested by Schefke et al.

U.S. Pat. No. 4,104,710 to Damico et al. discloses an integral patient headwall unit designed to provide the necessary lighting, communication, gas and other electrical services to a hospital room. The present invention differs from the teachings of Damico et al. as contemplating a particular interrelation of parts nowhere taught or suggested therein. In particular, the present invention contemplates the use of a gas rail assembly which may be mounted in any one of two orientations in the supply rail system as well as a configuration of electrical conductors nowhere taught or suggested therein.

U.S. Pat. No. 4,338,485 to Fullenkamp et al. discloses a headwall unit for patient servicing and method for installation. Whereas the Fullenkamp et al. device is mounted vertically within a patient care room, the present invention is intended to be mounted horizontally therein and includes several features nowhere taught or suggested by Fullenkamp et al., including the provision of a gas rail mountable in any one of two orientations therein.

U.S. Pat. No. 4,534,147 to Cristell discloses a duct molding designed to retain therein a multiplicity of electrical conductors. Cristell fails to contemplate a device which permits supply of electricity as well as gas therethrough and which includes a gas rail capable of being mounted therein in any one of two diverse orientations as is the case in the present invention.

U.S. Pat. No. 4,821,470 to Kappers et al. discloses a headwall for hospital bed which includes two horizontally spaced modules designed to provide services to a hospital bed. While this patent contemplates supply of gas as well as electricity, the present invention differs as contemplating a different configuration of parts including the provision of a gas rail assembly mountable in any one of two diverse orientations.

U.S. Pat. No. 4,882,453 to Chelsea discloses a wire management assembly designed to be mounted on the wall or panel of a work station or office. Chelsea is limited to electrical conductors and does not contemplate the gas rail assembly details of the present invention.

U.S. Pat. No. 4,905,433 to Miller discloses a hospital head wall system having horizontal raceways and vertical chases. The middle raceway contains wiring for electrical conductors of diverse capacities and the device includes conduits for supply and exhaust of various medical gasses. The present invention differs from the teachings of Miller as contemplating the use of a gas rail capable of being mounted therein in any one of two diverse orientations. Miller also fails to contemplate the teachings of the present invention including the particular orientation and location of electrical conductors therein.

U.S. Pat. No. 5,024,614 to Dola et al. discloses a surface accessible wiring system and assembly which includes separate wiring compartments as well as cut-outs to facilitate installation of components. While, in these respects, Dola et al. disclose structure generally related to the teachings of the present invention, Dola et al. fail to contemplate the combining of the provision for electrical conductors with the provision of a gas rail mountable in any one of two diverse orientations within the system.

Applicants are also aware of the following U.S. patents which are generally related to the gas rail subcombination of the present invention:

U.S. Pat. No. 3,004,330 to Wilkins
U.S. Pat. No. 4,498,693 to Schindele
U.S. Pat. No. 4,718,699 to Kulish et al.
U.S. Pat. No. 4,975,055 to LaPlante
U.S. Pat. No. 5,197,511 to Kohn et al.
U.S. Pat. No. 5,236,016 to Vogelsang.

None of these references contemplates the significant aspects of the gas rail sub-assembly of the present invention, particularly the interaction between the universal bracket and the gas rail sub-assembly permitting the gas rail sub-assembly to be mounted on the universal bracket in any one of two diverse positions and orientations with respect to the universal bracket.

SUMMARY OF THE INVENTION

The present invention relates to a wall mountable universal bracket for mounting a raceway system for use in a hospital room. The present invention includes the following interrelated objects, aspects and features:

(A) In a first aspect, the universal bracket includes an L-shaped bracket designed to mount the raceway system conveniently on a suitable wall surface. The universal bracket includes three grooves. A gas rail sub-assembly has flanges designed to interact with the grooves on the universal bracket to permit mounting of the gas rail sub-assembly on the universal bracket in any one of two diverse orientations.

(B) The universal bracket includes further grooves designed to interact with flanges on a harness system for electrical conductor called an ANTI-PASTA™ clip to allow retention, within the universal bracket, of such electrical conductors.

(C) The universal bracket includes means permitting mounting of a raceway system enclosed by an upper housing above the universal bracket, wherein the upper housing sits on a horizontal leg of the universal bracket. The mounting means includes a clip adjacent the vertical leg of the universal bracket and an opening through the horizontal leg of the universal bracket permitting insertion, therethrough, of a fastener designed to be received within an opening of the upper housing.

(D) The raceway system in the upper housing includes a multiplicity of separate, elongated chambers, each one of which is designed to receive a separate, singular or plurality of electrical conductors designed to convey power to and/or from a hospital room.

(E) A variety of "knock outs" are provided in the upper housing which may be suitably removed in a manner well known to those skilled in the art to allow access to the interior of the upper housing to facilitate installation of wiring. The upper housing also includes removable covers which also allow access to the elongated chambers within the upper housing.

(F) Electrical receptacles may be installed in the raceway including devices and receptacles for various voltages, different amperages and different phases, to permit plugging in of patient monitoring equipment and to permit installation of systems such as a "nurse call" system, cable television and other devices requiring an electrical raceway.

(G) The gas rail sub-assembly is designed to facilitate supply of, for example, vacuum, pressurized oxygen and pressurized air.

Accordingly, it is a first object of the present invention to provide a wall mountable universal bracket for supporting a raceway system for a hospital room.

It is a further object of the present invention to provide such a system including a gas rail sub-assembly which may be mounted therewithin in any one of two diverse orientations.

It is a still further object of the present invention to provide an upper housing containing raceways designed to receive diverse electrical conductors for various purposes including patient monitoring, "nurse call" systems, telephone systems, cable TV, and other devices requiring various voltages, different amperages and different phases.

It is a yet further object of the present invention to provide such a system including removable covers and "knock outs" for facilitating installation of appropriate wiring.

These and other objects, aspects and features of the present invention will be better understood from the following detailed description of the preferred embodiments when read in conjunction with the appended drawing figures.

BRIEF DESCRIPTION OF THE DRAWINGS

FIG. 10 shows a cross-sectional view through a divider portion of the raceway upper housing of the present invention;

FIG. 11 shows a front view of the divider portion of FIG. 10;

SPECIFIC DESCRIPTION OF THE PREFERRED EMBODIMENTS

Figure 1:
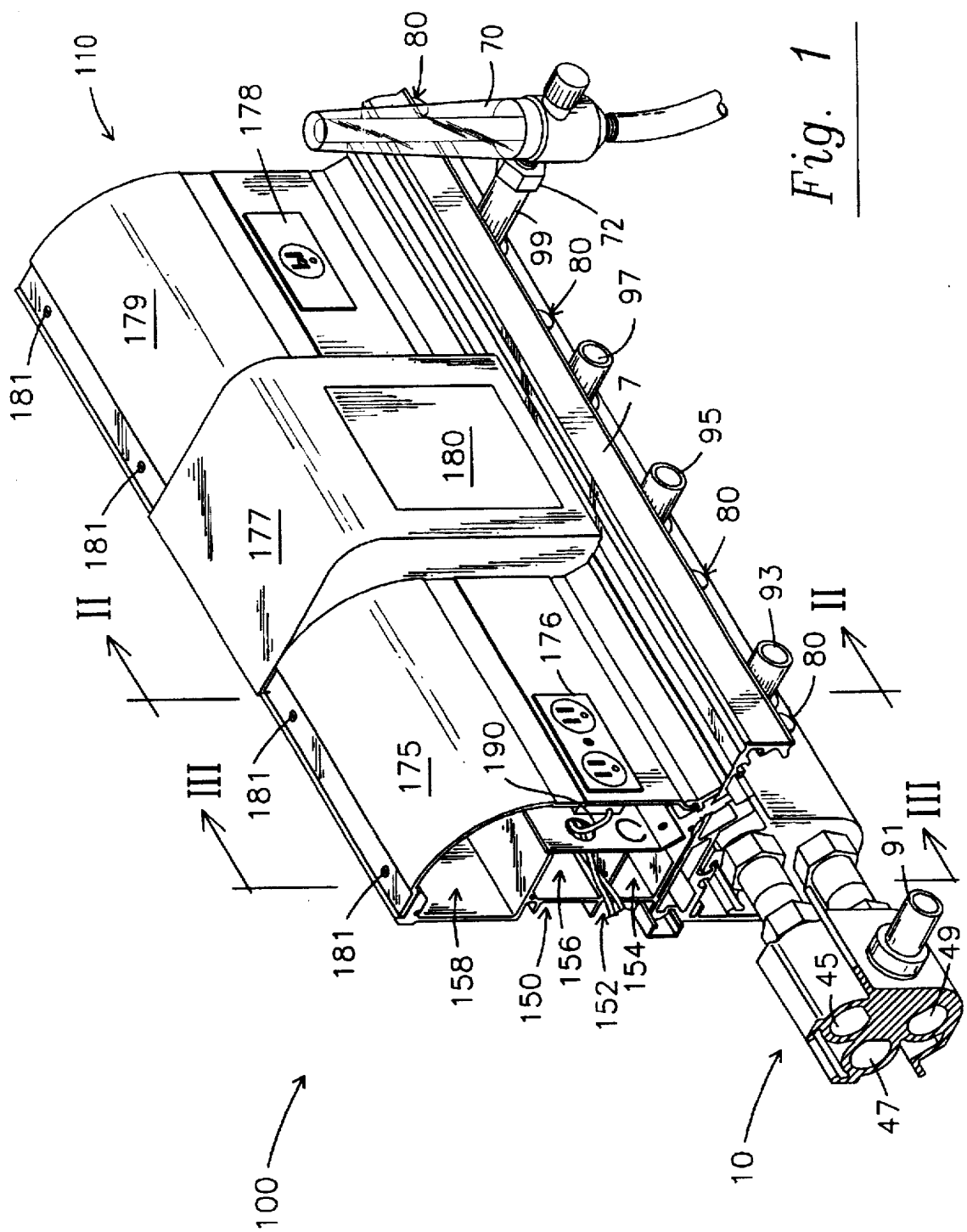
FIG. 1 shows an isometric view of the raceway and gas rail system with portions broken away to show detail.

With particular reference, first, to FIGS. 1, 2, 3 and 7, the present invention is generally designated by the reference numeral 100 and is seen to include a universal bracket 11 for supporting a gas rail sub-assembly 10 and a raceway 110 mounted above the gas rail sub-assembly 10 in a manner to be described in greater detail hereinafter. With particular reference to FIGS. 2, 3, 5, 6, 7, 8, 13 and 14, the universal bracket 11 and gas rail sub-assembly 10 will be described in detail.

With particular reference to FIGS. 2, 3, 5 and 6, the universal bracket 11 is shown in its preferred orientation with respect to a vertical surface or wall 1. As shown, the universal bracket 11 has a vertical portion 13 having holes 15 and 17 therethrough which respectively receive screws 3 and 5 which are received within the wall 1 to mount the universal bracket 11 in the position and orientation shown.

The universal bracket 11 further includes a horizontal portion 19 which terminates at a downwardly depending lip 21 which includes a face 23 defined by upper and lower grooves 25 and 27, respectively. The grooves 25 and 27 are intended to releasably receive a decorative piece of trim 7 as particularly shown in FIG. 1. The universal bracket 11 includes grooves 76 and 78 along a top and bottom surface extending near the edge of the upper and lower corners for accommodating a movable rail while mounting equipment thereon using grooves 76 and 78.

With further reference, in particular, to FIGS. 2, 3, 5, 6 and 7, the vertical portion 13 includes a first groove 29 therein which is adjacent the lower terminus 14 of the vertical portion 13. The vertical portion 13 also has a generally flat inner wall 16 between the holes 15 and 17 for a purpose to be described in greater detail hereinafter.

The horizontal portion 19 includes a second groove 31 as well as a third groove 33. The horizontal portion also includes a fourth groove 35 and a fifth groove 37. The significance of the grooves 29, 31, 33, 35 and 37 will be described in greater detail hereinafter.

With reference to FIGS. 2, 3, 5, 6 and 8, in particular, the gas rail sub-assembly 41 is seen to include a body 43 which includes passageways 45, 47 and 49 therethrough. These passageways are designed to convey vacuum, pressurized oxygen and air respectively therethrough. As will be explained in greater detail hereinafter, various fluid couplings are provided to supply fluids to the conduits 45, 47 and 49 and to exhaust fluids therefrom.

The gas rail sub-assembly 41 includes a first flange 51, a second flange 53, a third flange 55 and a fourth flange 57. As shown, the flange 51 has an opening 52 therethrough designed to receive a screw. Similarly, the flange 57 has an opening 58 therethrough designed to receive a screw. Such screws are particularly shown in FIGS. 2, 3, 5 and 6.

Furthermore, the flange 53 includes a flat outer surface 59 as well as a tapered termination 61. Similarly, the flange 55 has a flat outer wall 63 and a tapered termination 65. The flat outer walls 59, 63 and the tapered terminations 61, 65 are provided for purposes to be described in greater detail hereinafter.

Figure 2:
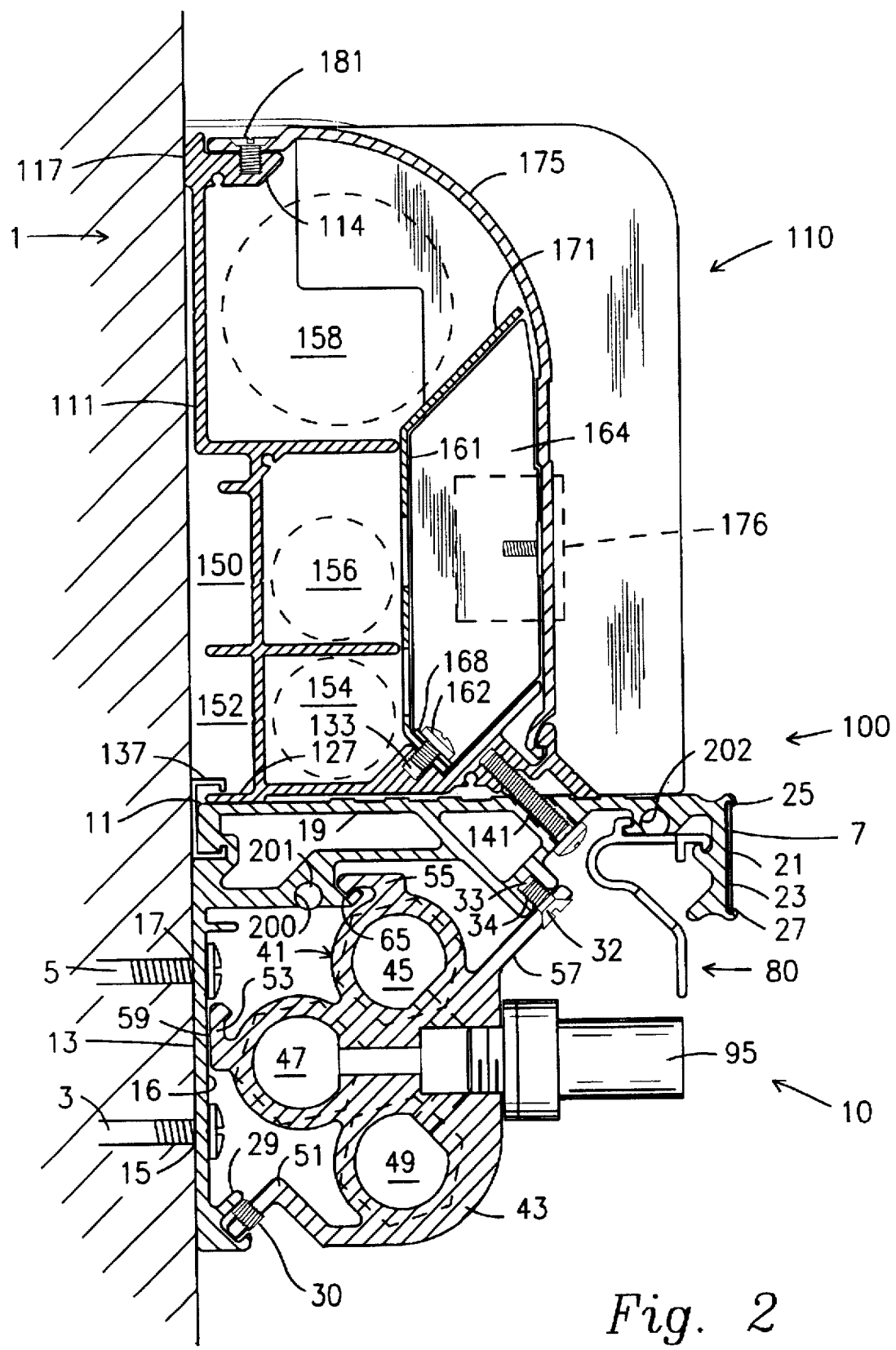
FIG. 2 shows a cross-sectional view along the line II—II of FIG. 1.
Figure 6:
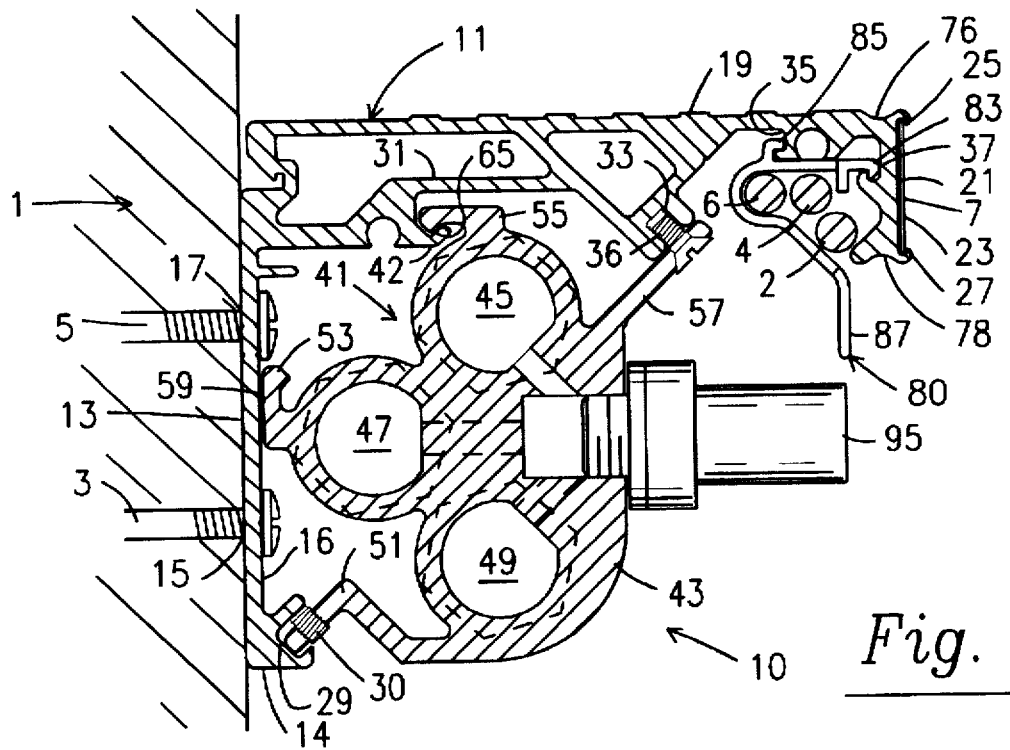
FIG. 6 shows a cross-sectional view similar to the view of FIG. 2 but with the raceway upper housing removed to allow focusing on the details of the gas rail sub-assembly.

With reference now to FIGS. 2 and 6, it is seen that the gas rail sub-assembly 41 can be mounted on the universal bracket 11 in a first orientation with respect thereto. In the orientation shown in FIGS. 2 and 6, the flange 51 is mounted to the groove 29 through the use of an adjustable screw 30 extending through the opening 52 in the flange 51 and received within an opening (not shown) in the groove 29. The flange 57 is mounted to the groove 33 by a similar fastener 32 extending through the opening 58 in the flange 57 and received within an opening 34 in the groove 33.

The flat surface 59 of the flange 53 rests upon the corresponding flat surface 16 of the vertical portion 13 of the universal bracket 11. The groove 31 in the universal bracket 11 receives the flange 55 of the gas rail sub-assembly 41 with the tapered termination 65 thereof received within a corresponding surface 42 (FIG. 7) of the groove 31.

Figure 3:
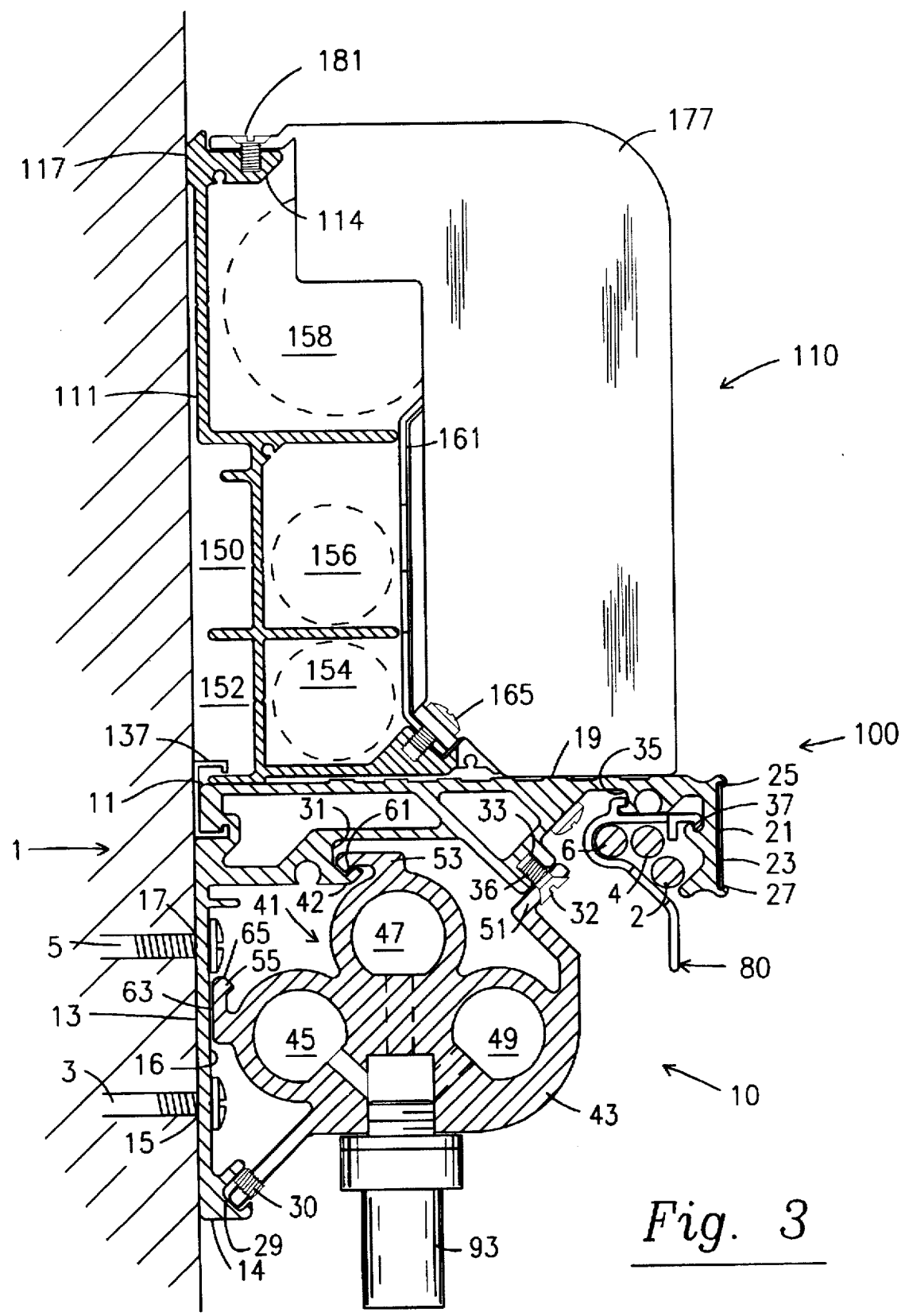
FIG. 3 shows a cross-sectional view along the line III—III of FIG. 1, however, with the gas rail sub-assembly shown in a different mounted orientation with respect to the associated universal bracket.
Figure 5:
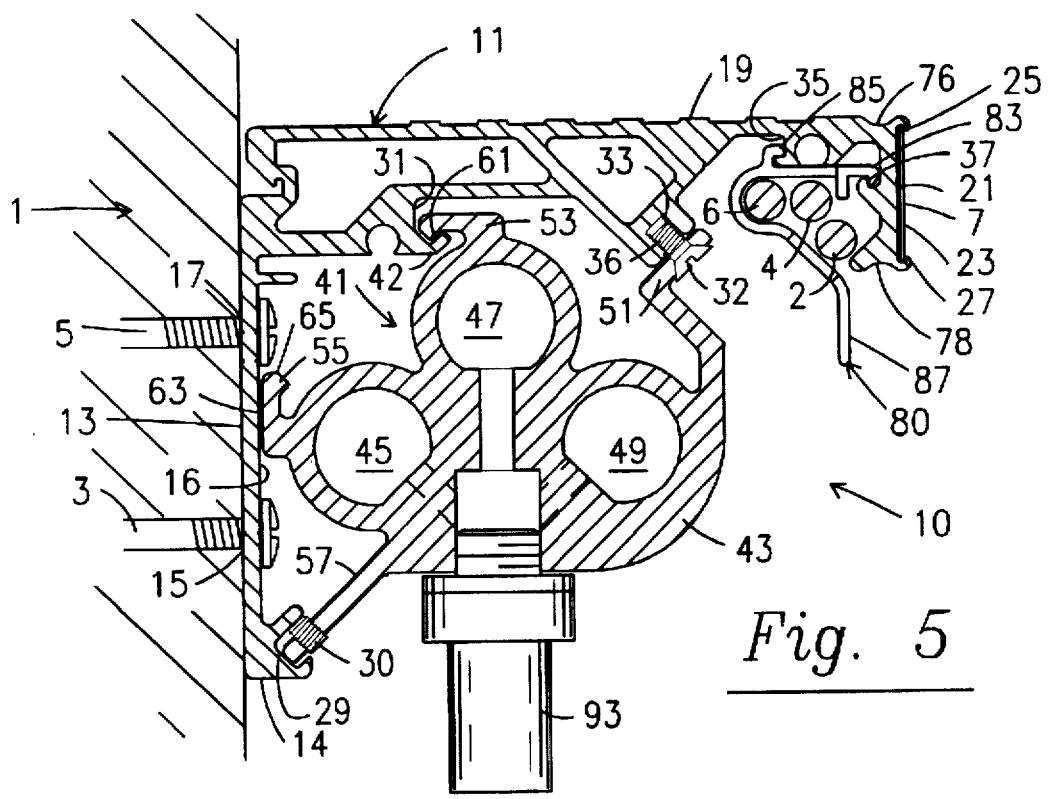
FIG. 5 shows a cross-sectional view similar to the view of FIG. 3 but with the raceway upper housing removed to permit focusing on the gas rail sub-assembly.

With reference now to FIGS. 3 and 5, a second mountable orientation of the gas rail sub-assembly 41 with respect to the universal bracket 11 is shown. As shown in FIGS. 3 and 5, a second position and orientation of mounting of the gas rail sub-assembly 41 to the universal bracket 11 is as follows: the flange 57 is mounted to the groove 29 by the fastener 30 extending through the opening 58 in the flange 57 and received within the opening of the groove 29. The flange 51 is mounted to the groove 33 via the fastener 32 which extends through the opening 52 in the flange 51 and thence is received in the opening 34 of the groove 33. The flat surface 63 of the flange 55 rests against the flat inner wall 16 of the vertical portion 13 of the universal bracket 11. The flange 53 is mounted on the groove 31 with the depending portion 61 of the flange 53 being received within a corresponding recess 42 of the groove 31. In order to achieve the orientation of the gas rail sub-assembly 41 as shown in FIGS. 3 and 5 as compared to the orientation thereof as shown in FIGS. 2 and 6, the gas rail sub-assembly 41 is rotated in direction and position to the orientation shown.

Figure 13:
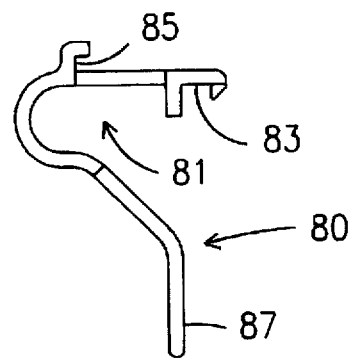
FIG. 13 shows an end view of an ANTI-PASTA™ clip also shown in FIGS. 2–6.
Figure 14:
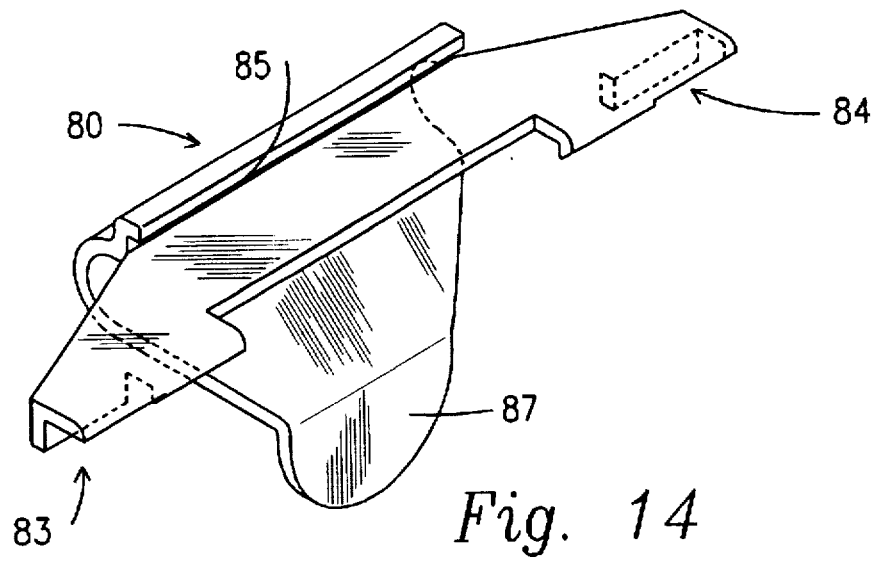
FIG. 14 shows an isometric view of the ANTI-PASTA™ clip of FIG. 13.

With reference now to FIGS. 13 and 14, the ANTI-PASTA™ clip 80 is seen to include parallel, spaced flanges 83 and 84, a further flange 85 and a depending portion 87. A chamber 81 is formed by the surface of the clip 80 between the flange 85 and the depending portion 87.

As particularly shown in FIGS. 5 and 6, the clip 80 is installed in the universal bracket 11 with the flanges 83 and 84 engaging the groove 37 and with the flange 85 engaging the groove 35. The depending portion 87 is employed to install the clip 80 in place. As particularly shown in FIGS. 3, 5 and 6, the clip 80 is designed to enclose and retain electrical conductors 2, 4 and 6 which may provide power to various appliances within a hospital room while also being capable of conveying signals from monitoring equipment within a hospital room to a remote location where monitoring may take place.

As shown in FIGS. 1, 2, 3, 5 and 6, various fluid couplers 91, 93, 95, 97 and 99 are shown. With reference to FIG. 6, the coupler 95 is seen to fluidly connect the conduit 45 and, with reference to FIG. 5, the coupler 93 is seen to fluidly connect with the conduit 47. The particular means of connection between the couplers 91, 93, 95, 97 and 99 and the conduits 45, 47 and 49 are in conformity with common industry plumbing practice. A flow meter 70 is connected to horizontal couplers 91, 95 and 99 with a locking nut 72.

Figures 7, 8, 9:
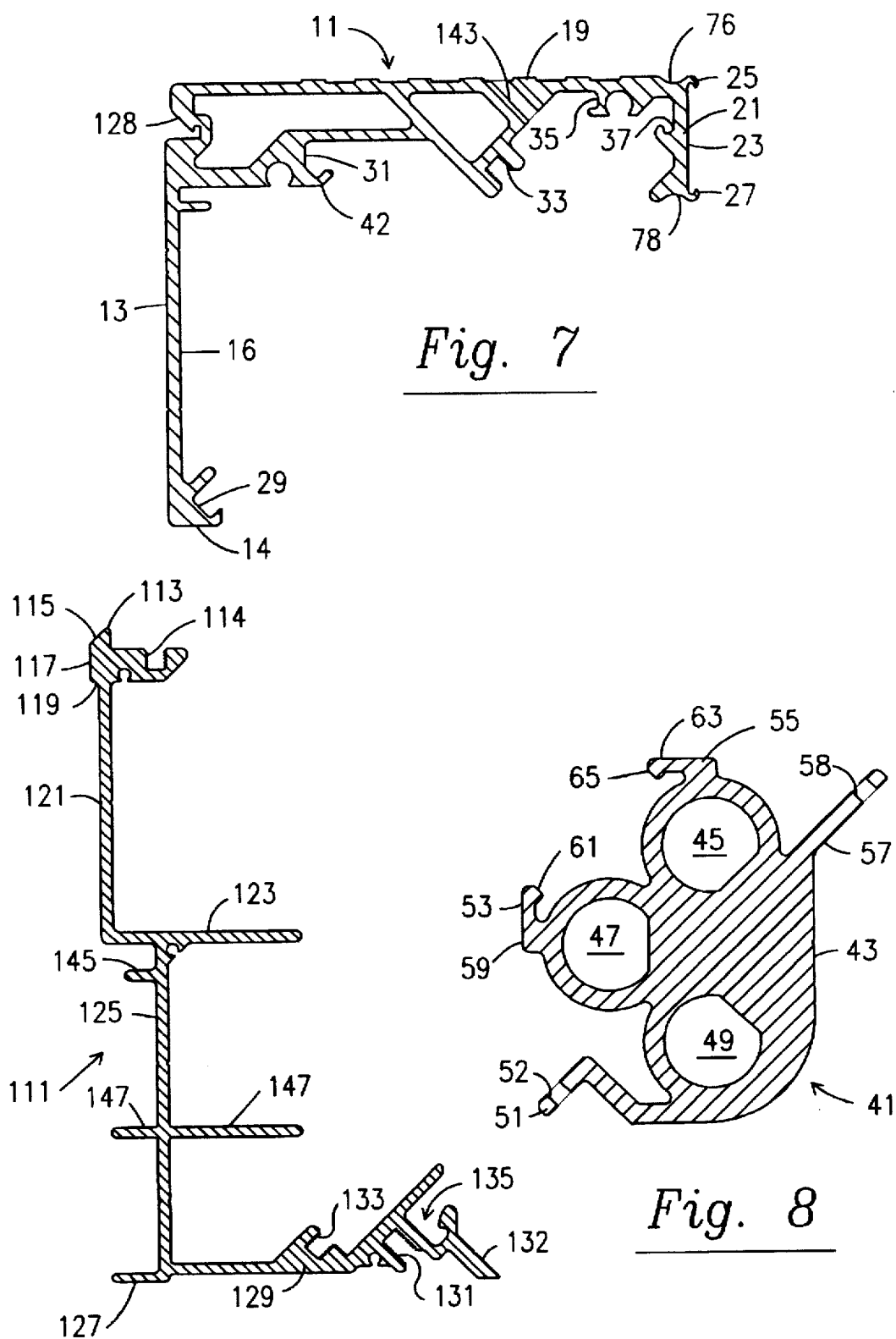
FIG. 7 shows a cross-sectional view through the universal bracket of the present invention.
FIG. 8 shows a cross-sectional view through the gas rail sub-assembly of the present invention.
FIG. 9 shows a cross-sectional view through portions of the raceway upper housing of the present invention.

With particular reference now to FIGS. 2, 3 and 9, the raceway 110 is seen to include a first upper housing portion 111 (seen in its entirety in FIG. 9) which includes an upper terminus 113 connected to a slanted wall 115 which is connected to a vertical surface 117 designed to rest on a wall surface as best seen in FIGS. 2 and 3. Below the vertical surface 117, a further slanted wall surface 119 is provided which is connected to an elongated vertical wall 121 which connects with a horizontal stepped portion 123 which further connects with a lower vertical portion 125 which terminates at a horizontal step 127 designed to sit on the horizontal portion of the universal bracket 11 as best seen in FIGS. 2 and 3. The housing portion 111 also includes a lower horizontal portion 129 having a threaded recess 131, a further threaded recess 133 and a groove 135. As particularly shown in FIG. 2, the upper housing 111 is mounted on the universal bracket 11 through the use of attachment means including a clip 137 which engages an upper surface of the horizontal step 127 as well as a recess or groove 128 in the universal bracket 11 (FIG. 7) to fix these two structures together. Further attachment means consist of a fastener 141 (FIG. 2) extending through an opening 143 in the universal bracket 11 (FIG. 7) and thence into the threaded recess 131 of the upper housing 111 (FIG. 9) to fixedly mount the upper housing portion 111 to the universal bracket 11.

With reference back to FIG. 9, the vertical portion 125 has extending horizontally therefrom horizontal portions 145 and 147. As should be understood from FIGS. 2, 3 and 9, the various horizontal and vertical portions of the first upper housing portion 111 define or partially define, along with associated structure, a variety of sub-chambers, such as airways 150 and 152 and raceways 154, 156, 158, and 164. These sub-chambers are particularly shown in FIGS. 2 and 3. As shown in FIGS. 2 and 3, the air spaces 150 and 152 are partially defined by the adjacent wall 1. The raceways 154 and 156 are partially defined by the removable cover plate 161 which is particularly seen in FIGS. 2, 3, 10 and 11. The cover plate 161 includes openings 163 (FIG. 11) designed to receive fasteners 165, which fasteners are also received within the openings 133 of the upper housing portion 111 (FIG. 9) to fasten the removable cover plate 161 in a mounted position.

With reference to FIGS. 10 and 11, the cover plate 161 is seen to include an elongated, vertical wall 167 connected at its lower end with a slanted wall 169 which carries the openings 163 and a slanted upper wall 171 which, as best seen in FIG. 2, contributes to the enclosure of the chamber 158.

With further reference to FIG. 11, "knock outs" 173 are provided which may be suitably removed by any desired means, such as a screwdriver or hammer, to allow access to the raceways 154 and 156 to best facilitate viewing these raceways and/or installation of electrical conductors therein. With reference to FIG. 1, a "knock out" 173 is seen removed with an electrical conductor 190 extending therethrough from the raceway 156 and being used to provide electrical power to the receptacle 176.

Additional cover plates 175, 177 and 179 are best seen in FIG. 1. The cover plate 175 is also seen in FIG. 2 and is seen to include installation therein of an electrical receptacle 176 which is also seen in FIG. 1. Also seen in FIG. 1 is the electrical jack 178 installed in the cover plate 179 which may, for example, provide electrical power or telephone hook-up or cable television hook-up or any other suitable interconnection.

With further reference to FIG. 1, the cover plate 177 includes an enlarged "knock out" 180 which may also be suitably removed to allow access to the interior of the chamber formed by the cover plate 177 and the associated structure of the upper housing portion 111.

With reference to FIG. 2, it is seen that the cover plate 175 may be mounted to the upper housing portion through the use of a fastener 181 received within an opening 114 (FIG. 9) in the upper housing portion 111. FIG. 3 shows similar means for mounting the cover plate 177 on the upper housing portion 111, to-wit, a fastener 181 received within an opening 114 in the upper housing portion 111.

Figure 12:
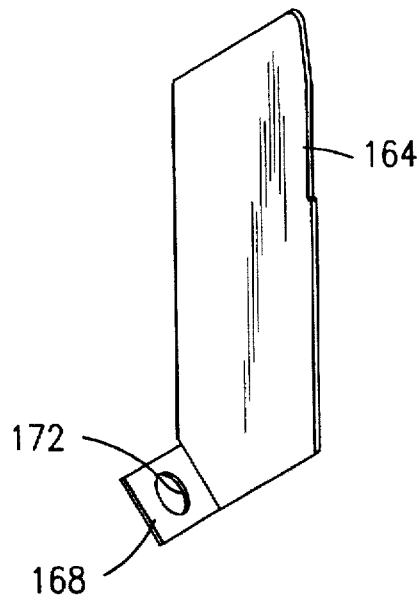
FIG. 12 shows an isometric view of an electrical raceway barrier in the raceway upper housing.

As seen in FIG. 2, between the cover plate 175 and the cover plate 161, a raceway barrier 164 is perpendicularly disposed. With reference to FIG. 12, this raceway barrier 164 has a depending tab 168 with an opening 172 therethrough. As shown in FIG. 2, a screw 162 extends through the opening 172 and is received in an opening 133 to mount the raceway barrier 164 therein. If desired, the raceway barrier 164 may be designed as a "knock out" device, easily knocked out to allow access to locations lateral thereof.

Figure 4:
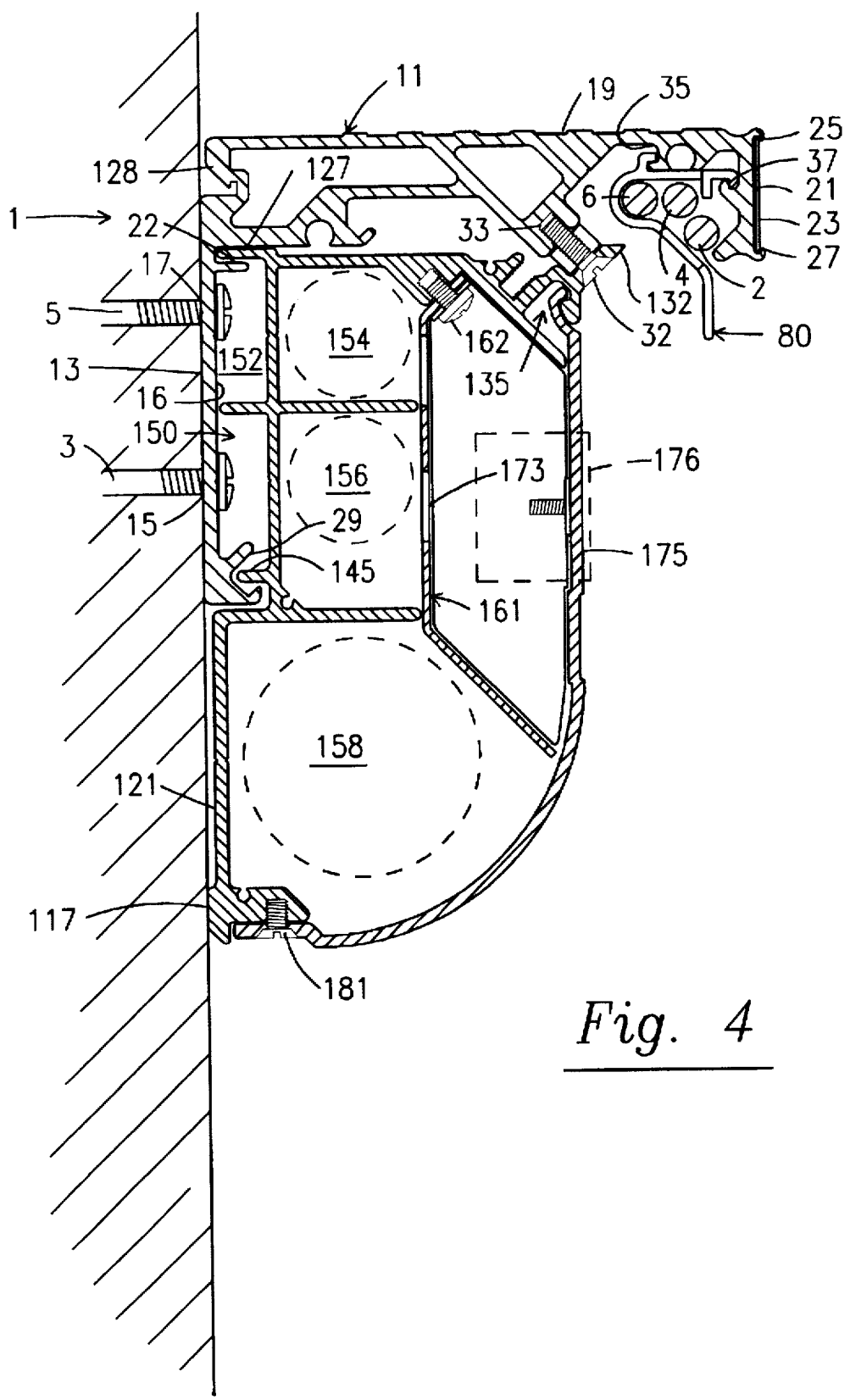
FIG. 4 shows a cross-sectional view through a further modification wherein the gas rail sub-assembly illustrated in FIGS. 1, 2 and 3 is removed and the raceway upper housing shown in FIGS. 1, 2 and 3 is mounted directly to the universal bracket instead of the gas rail sub-assembly.

With reference now to FIG. 4, a modified association of parts of the present invention is shown. In the embodiment shown in FIG. 4, the gas rail sub-assembly 41 is not employed. Instead, the upper housing portion 111 is mounted within the universal bracket 11 in the manner and orientation illustrated in FIG. 4 and utilizing the attachment means described below.

As shown in FIG. 4, the universal bracket 11 includes a recess or groove 22 which is designed, in the configuration shown in FIG. 4, to receive the horizontal step 127. The groove 29 of the universal bracket 11 receives the step 145 while the vertical surface 117 of the upper housing portion 111 engages the surface of the wall 1 below the universal bracket 11, as shown.

As also shown in FIG. 4, the upper housing portion 111 is securely fastened to the universal bracket 11 through the use of the fastener 32 through an opening formed in the leg 132 (FIG. 9) of the upper housing portion 111 which fastener 32 enters the recess 33 in the universal bracket 11. In the view of FIG. 4 which is shown, the cover 175 is seen mounted on the upper housing portion 111 in the same manner shown in FIG. 2, to-wit, with the fastener 181 suitably employed as shown and with the other end of the cover 175 entering the recess 135 therein.

In the embodiment of FIG. 4, only the raceway supported on the universal bracket 11 is shown. This configuration solely provides electrical monitoring and supply.

With reference back to FIG. 2, it is seen that the universal bracket 11 includes an elongated recess of generally circular cross-section and designated by the reference numeral 200, which recess 200 may slidably receive the pin 201 which is designed to interconnect recesses 200 on adjacent rail assemblies to assist in structurally integrating them together. A similar recess 202 is also provided in the universal bracket 11 adjacent the ANTI-PASTA™ clip 80, as shown.

The various components, features and aspects of the present invention may be made of any suitable materials such as plastic, wood, metal or any other suitable materials.

As such, an invention has been described in terms of preferred embodiments thereof which fulfill each and every one of the objects, aspects and features of the present invention as set forth hereinabove and provide a new and useful wall mountable universal bracket for use with a raceway system for a hospital room of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

What is claimed is:

1. A wall mountable raceway system, comprising:
    a) a general L-shaped configuration having a vertical portion adapted to be attached to a wall and a horizontal portion depending therefrom;
    b) the horizontal portion terminating at a downwardly depending lip containing a face defined by first upper and lower grooves, and a second pair of grooves extending near an edge of the horizontal portion proximal to the lip on a top and bottom surface of the horizontal portion;
    c) the vertical portion having a first groove adjacent a lower end, a flat inner wall between a pair of mounting holes, and a second groove adjacent an upper end for engagement with a universal bracket for holding another structure in close engagement with the universal bracket;
    d) an upper housing attachable to the universal bracket, the upper housing including a plurality of elongated raceways each of which is adapted to receive electrical conductors therethrough; and
    e) attachment means for attaching the upper housing to the universal bracket in either one of two positions, the attachment means including:
        i) in a first position with the upper housing attached above the horizontal portion of the universal bracket, a clip interconnected between the second groove in the vertical portion of the universal bracket and a horizontal step extending from the upper housing; and
        ii) in a second position with the upper housing attached below the horizontal portion of the universal bracket, the vertical portion having a third groove below the horizontal portion, the horizontal step being received within the third groove.

2. The system of claim 1, wherein in the first position, at least one fastener joins the upper housing and the universal bracket.

3. The system of claim 1, wherein in the second position, at least one fastener joins the upper housing and the universal bracket.

4. The system of claim 1, wherein at least one of the raceways is partially defined by a raceway wall having a "knock out" portion adapted to be forcibly removed therefrom to allow access to said at least one of the raceways.

5. The system of claim 4, wherein at least one of the raceways is partially defined by a raceway barrier having a further "knock out" portion.

6. The system of claim 5, wherein at least one of the raceways is partially defined by a cover.

7. The system of claim 6, wherein the cover has an electrical receptacle mounted thereto and wired to an electrical conductor extending through one of the raceways.

8. The system of claim 1, wherein the upper housing has a vertical surface adapted to engage an adjacent wall surface in the first and second positions of the upper housing, the vertical surface being adjacent a highest region of elevation of the upper housing in the first position and being adjacent a lowest region of elevation of the upper housing in the second position.

9. The system of claim 1, wherein in the first position of the upper housing, the system further includes a gas rail sub-assembly mounted below the horizontal portion, the gas rail sub-assembly comprising a gas rail body including a plurality of fluid conduits therein, coupling means for coupling the conduits with respective sources and end users of fluid.

10. The system of claim 9, wherein the gas rail sub-assembly has a first flange and a second flange angularly disposed with respect to one another, the universal bracket having an elongated third groove on the horizontal portion, the vertical portion of the universal bracket having an inner surface.

11. The system of claim 10, wherein each of the gas rail sub-assembly flanges has (1) a further surface having at least a portion thereof complementary with the vertical portion inner surface, and (2) a depending termination complementary with the elongated groove, the gas rail sub-assembly being mountable on the universal bracket in either one of two orientations with respect thereto, a first orientation whereby the first flange is received by the elongated groove and the second flange further surface engages the inner surface, and a second orientation whereby the second flange is received by the elongated groove and the first flange further surface engages the inner surface.

12. The system of claim 11, wherein the first flange further surface is perpendicular to the second flange further surface.

13. The system of claim 12, wherein the universal bracket vertical portion is perpendicular to the universal bracket horizontal portion.

14. The system of claim 9, wherein the plurality of fluid conduits comprises three conduits.

* * * * *